Oct. 13, 1959  R. OLDENBURGER  2,908,826
NON-LINEAR SPEED AND LOAD GOVERNOR FOR ALTERNATORS
Filed Jan. 8, 1958  4 Sheets-Sheet 2

Fig. 1b.

INVENTOR.
Rufus Oldenburger
BY
Carlson, Pitzner, Hubbard & Wolfe
Attys.

CASE I
OFF-LINE OPERATION WITH
PROPER OFF-LINE SIGNAL
PROPORTIONS

CASE II
ON-LINE OPERATION WITH
PROPER ON-LINE SIGNAL
PROPORTIONS

CASE III
OFF-LINE OPERATION WITH
ON-LINE SIGNAL
PROPORTIONS

CASE IV
ON-LINE OPERATION WITH
OFF-LINE SIGNAL
PROPORTIONS

INVENTOR.
Rufus Oldenburger
BY
Carlson, Pitzner, Hubbard & Wolfe
Attys.

United States Patent Office 2,908,826
Patented Oct. 13, 1959

2,908,826

NON-LINEAR SPEED AND LOAD GOVERNOR FOR ALTERNATORS

Rufus Oldenburger, Lafayette, Ind., assignor to Woodward Governor Company, Rockford, Ill., a corporation of Illinois Application January 8, 1958, Serial No. 707,792

7 Claims. (Cl. 290—4)

This invention relates in general to governor systems, and in particular to systems for controlling the speed, frequency, and loading of alternating current generators driven by prime movers.

It is the general aim of the invention to improve the governing of an alternator by providing non-linear control of its speed and loading, reducing to a minimum the duration and magnitude of transients caused by abrupt changes in conditions—both when the alternator is on or off the distribution line—thereby permitting the alternator to be brought rapidly from a standstill to synchronous speed, or enabling changes in loading of the alternator to be accomplished almost instantaneously.

An important object of the invention is to provide a governor for the prime mover of an alternator which operates on a plural-signal control function, and in which the relative strength of each signal component may be adjusted independently without affecting the strength of the other signal components and without changing the time constants or lags of the system.

It is a further object of the invention to provide a non-linear governor system for an alternator in which the proper adjustments of control constants are effected automatically as the alternator is switched on to or off of the distribution line, thus giving optimum performance under all conditions, yet without requiring any attention on the part of an operator or technician.

Still another object is to bring about the contemplated improvements in performance of alternator governors through the use of control components which are relatively simple in organization and reliable in operation.

Other objects and advantages will become apparent as the following description proceeds, taken in conjunction with the accompanying drawings, in which.

While the invention has been shown and will be described in some detail with reference to particular embodiments therein, there is no intention that it thus be limited to such detail. On the contrary, it is intended here to cover all alternatives, modifications, and equivalents falling within the spirit and scope of the invention as defined by the appended claims.

Figure 1A:
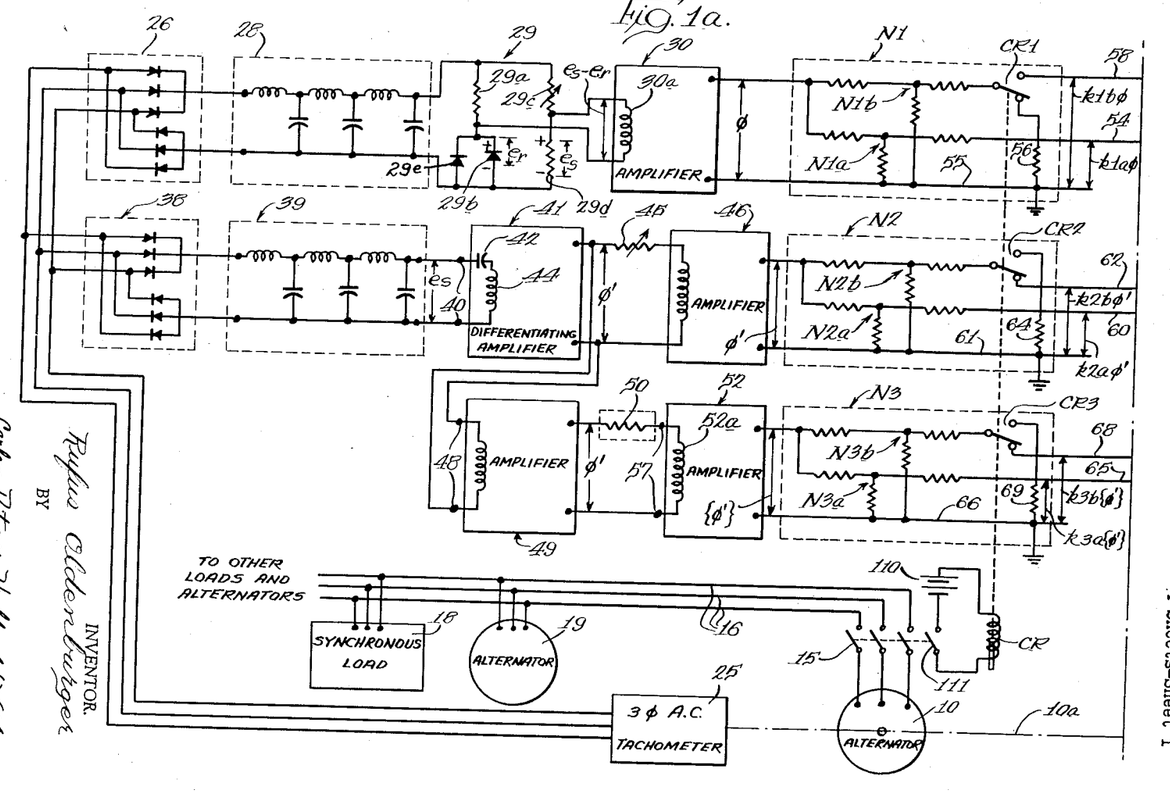
Figures 1a and 1b, when joined along the indicated junction line, are a diagrammatic illustration of a governing system embodying the features of the invention as applied to an alternator driven by a water turbine.
Figure 1B:
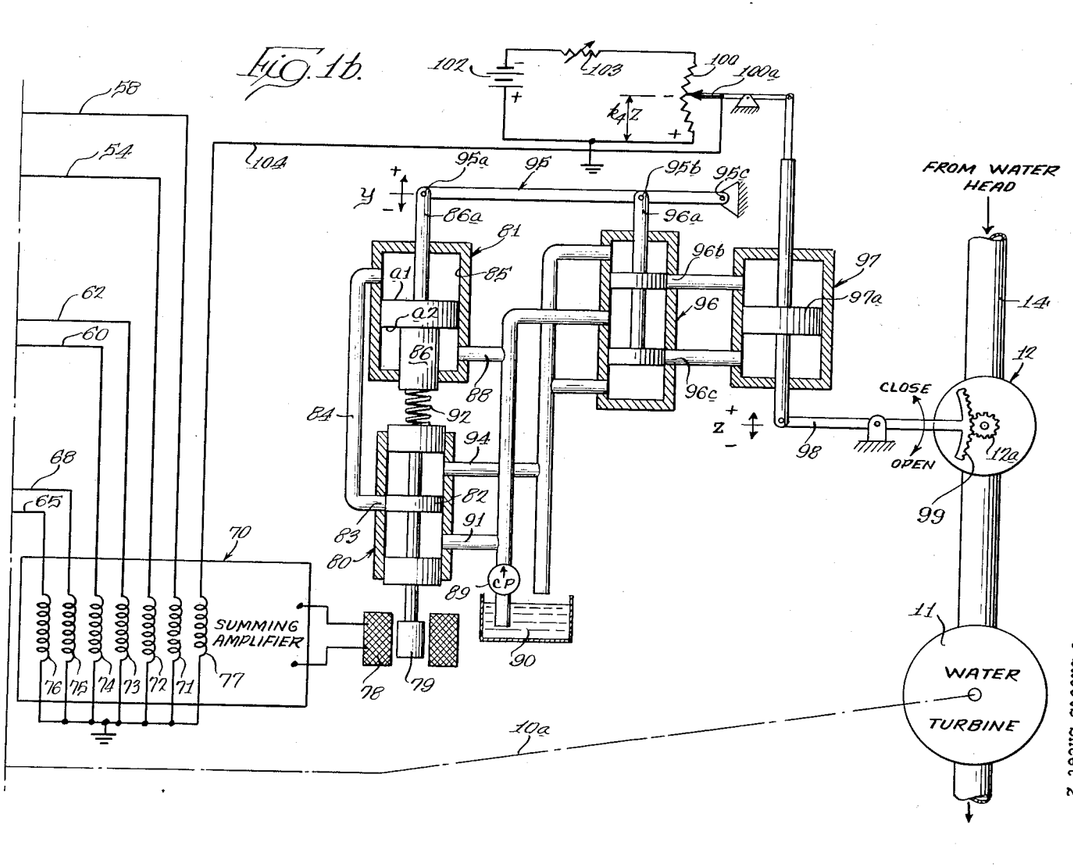

Referring now to Figs 1a and 1b, an alternator 10 is there diagrammatically shown as connected by a shaft 10a to be driven from a prime mover such as a water turbine 11. The turbzine receives its energy from pressurized water flowing from a head, such as a power dam, through an adjustable gate or wicket valve 12 and a water conduit 14. The alternator 10 is associated with means such as a 3-blade disconnect switch 15 for selectively connecting it to or disconnecting it from an electric power distribution line 16. The alternator 10 and the distribution line 16 are here illustrated as being of the conventional three phase organization.

The distribution line 16 as shown in Fig 1a is intended to represent part of a large electric distribution system, and may be considered as having connected therewith a variety of devices such as synchronous motors forming a synchronous load 18, and also as having connected in parallel thereto one or more additional alternators 19. The distribution line 16 thus has three phase voltages thereon even though the disconnect switch 15 is open to isolate the alternator 10 therefrom. When the switch 15 is closed, the alternator 10 is subjected to "synchronizing torque." Unless a force acting on the alternator rotor exceeds that synchronizing torque, the alternator is locked in speed to the frequency of the distribution line 16 acting either as a motor drawing power from the line and driving the turbine 11, or as a generator drawing mechanical power from the turbine 11 and supplying electrical power to the line 16. Under certain circumstances the gate valve 12 may be fully closed and the alternator at a standstill with the switch 15 open. This would be the case if the alternator were in standby service. To meet emergency power demands, it is frequently necessary that the alternator be started quickly and connected to the line 16. To satisfactorily accomplish this, it is highly desirable that some form of speed control be provided which will enable the gate valve 12 to be adjusted automatically to bring the turbine 11 and the alternator 10 to synchronous speed in a minimum of time. That is, the alternator must be accelerated to and stabilized at a rotational speed at which its generated voltage has a frequency exactly synchronized to the frequency of the distribution line 16 before the switch 15 may be closed. The governing system associated with the alternator 10, therefore, must be capable of bringing the alternator from one speed, say a rest condition, to another speed, say synchronous speed, without a long transient period, without overshoot, and without hunting or cycling.

After the disconnect switch 15 is closed, the alternator's speed will not vary in the absence of large disturbing forces. It will be locked to rotate at a speed synchronous to the frequency of the alternating voltages on the distribution line 16 by synchronizing torque. That is, if the alternator 10 tends to speed up beyond a synchronous speed, it will load the turbine 11 with more torque in supplying electrical energy into the distribution line, so that its speed cannot rise above a synchronous value. On the other hand, if the alternator 10 tends to drop in speed below synchronous value, it will take electrical energy from the line 16 and will be driven as a synchronous motor until its speed is returned to substantially synchronous value. Changes in the setting of the gate valve 12 with the disconnect switch 15 closed thus are effective to change the loading of the alternator, i.e., to adjust the amount of energy which it supplies into (or takes from) the line 16.

However, under these circumstances it is often necessary to change the loading on the alternator with speed and precision in order to protect other alternators or components connected to the line 16 when there are severe power demands. Changes in the speed setting of a governor having "droop" or "regulation" characteristics associated with the alternator will cause changes in the setting of the gate valve 12, and thus change the loading of the alternator 10. And ideally the governing system must be such that these changes in alternator loading are accomplished rapidly and smoothly without overshoot or hunting, in response to an abrupt or instantaneous change in the speed setting.

To provide optimum performance under both of these conditions, i.e., to change the speed of the alternator 10 when it is disconnected from the line 16 in a minimum of time with practically no overshoot or hunting, and to change the loading of the alternator 10 when it is connected to the line 16 in a minimum of time, the present invention contemplates the provision of a non-linear governing or control system which is automatically adjusted to accommodate the two different conditions which exist when the disconnect switch 15 is opened or closed. More specifically the governing system is made to adapt itself automatically to "off-line" and "on-line" conditions in which the alternator 10 is free of or subjected to synchronizing torque.

The non-linear governing system employed is of the basic type disclosed and claimed in my copending application Serial No. 384,957, filed October 8, 1953.

In the example here shown, the system includes means for creating a first signal which is proportional in magnitude to the speed of the alternator 10. Such means, as here illustrated, include a tachometer 25 connected to be driven by the shaft of the alternator 10. The tachometer is preferably a small three phase A.C. generator having a permanent magnet field, the amplitude of its generated voltage being proportional to the speed at which it is driven. The three phase output of the tachometer 25 is supplied first to a full wave rectifier 26 and thence passed through a smoothing filter 28 to an error sensing means 29.

The error sensing means 29 has the function of providing a signal which is proportional in magnitude to and agreeable in polarity with the deviation in the speed of the alternator from a desired, adjustable reference value. For this purpose, the signal proportional to the absolute speed of the alternator is algebraically combined with a constant, reference signal such that when the alternator has the desired speed, the resulting error or deviation signal has a predetermined value.

As shown in this instance, the error sensing means 29 includes a resistor 29a connected in series with a Zener diode 29b across the output terminals of the filter 28. The Zener diode, as is well known, has a very sharp reverse breakdown characteristic, permitting varying reverse current to flow therethrough with little or no change in the voltage thereacross once the reverse voltage applied thereto exceeds a predetermined value. With the Zener diode 29b reversely biased by the output voltage of the filter 28, as shown, the voltage appearing across that diode will have a substantially constant value, despite variations in the output voltage of the filter. Thus, the voltage across the diode 29b may be considered as a reference voltage $e_r$.

Also receiving the output voltage of the filter 28 is the series combination of a rheostat 29c and a resistor 29d. The voltage appearing across the latter resistor will always be proportional to the absolute speed of the alternator, but the factor of proportionality may be varied by adjusting the rheostat 29c. The voltage signal may be identified as the speed voltage $e_s$.

Connected across the series combination of the resistor 29d and the diode 29b is the input of a suitable amplifier, here shown as a magnetic amplifier 30 having an input winding 30a. The voltage applied to that winding, and the current through it, will be proportional in magnitude and agreeable in sense with the difference between the speed voltage and the reference voltage, i.e., $e_s - e_r$. This difference signal is proportional to the deviation of the alternator's speed from a desired value. The reference speed may be adjusted by changing the effective value of the rheostat 29c; the setting of the latter is thus termed the "speed setting."

A second Zener diode 29e is connected in parallel with the first one 29b. The second diode is chosen to have a slightly higher breakdown voltage than the first, and thus normally has no effect. However, if the first diode 29b should become defective and open-circuited, the second diode 29e comes into operation as a safety device, supplying a reference voltage only slightly higher than the first, so that the effective deviation signal does not abruptly decrease.

The amplified output of the amplifier 30 is thus proportional to the deviation in speed of the alternator from a predetermined value. By changing the setting of the rheostat 29c, the speed signal $e_s$ and the difference signal $e_s - e_r$ will be correspondingly changed for a given speed of the alternator. The amplified difference of the signals $e_s$ and $e_r$ appearing at the output terminal of the amplifier 30 is, therefore, proportional to the deviation in speed of the alternator 10 from the desired value or control point determined by the setting of the rheostat 29c. For convenience below, this deviation signal is referred to by the symbol "$\phi$".

Means are also provided for producing a signal which varies in proportion to a time derivative of the deviation in speed of the alternator 10 from a desired value or control point. For this purpose, the output of the tachometer 25 is also supplied through a second full wave rectifier 38 and thence through a smoothing filter 39 to the input terminals 40 of a differentiating amplifier 41. The terminals 40 connect with the series combination of a capacitor 42 and an input winding 44 in the amplifier 41, which may be of the magnetic type well known to those skilled in the art. The effect of the capacitor 42 in series with the winding 44 is to produce a differentiating action, in the same fashion as a conventional resistance-capacitance differentiating circuit. The output of the amplifier 41 therefore varies in proportion to the rate of change of the input signals supplied thereto. Since a voltage $e_s$ proportional to the speed of the alternator 10 is supplied to the input terminal 40, the output of the amplifier 41 will vary as the first time derivative of the speed of the alternator 10, and will thus be proportional to the rate of change of the signal $\phi$, here indicated by the symbol "$\phi'$."

In order to bring the derivative signal $\phi'$ to the desired proportionality with acceleration of the alternator 10, it is passed through an adjustable resistance 45 and thence amplified by a second magnetic amplifier 46. The output of the amplifier 46 will, nevertheless, be proportional to the first time derivative of deviations in speed of the alternator 10.

In order to produce a non-linear control signal component, and specifically a signal which varies as the "absquare" of a time derivative of speed deviation, the $\phi'$ signal here appearing at the output of the amplifier 41 is first amplified and then passed through a non-linear circuit element.

The term "absquare" as used herein is intended to denote a variation which is proportional to the signed square of a variable. For example, the square of a variable "$x$" is the product of that varible multiplied by itself, and is always positive whether the variable has a positive or negative value. The absquare of a variable "$x$," by contrast, is equal to the value of the variable multiplied by itself, but carries the sign of the variable. Thus, the absquare of $+x$ is $+x^2$ while the absquare of $-x$ is $-x^2$. For convenience, the absquare of a variable is denoted herein by enclosing it in wavy brackets, e.g., the absquare of a variable $x$ is written $\{x\}$. As disclosed in the aforementioned copending application, Serial No. 384,957, the absquare of a varying electrical signal may be produced by employing a non-linear resistor such as "thyrite," which has a resistance substantially inversely proportional to the square of the voltage supplied thereto. In other words, the current passed by a "thyrite" resistance element is substantially proportional to the square of the voltage supplied thereto, yet that current has a direction or polarity which may be either positive or negative depending upon whether the applied voltage is positive or negative.

As illustrated in Fig. 1a, the output signal $\phi'$ of the amplifier 41 is supplied to the input terminals 48 of a magnetic amplifier 49, and the amplified output of the latter, proportional to $\phi'$ is passed through a non-linear resistor 50, such as thyrite, and thence to the input terminals 51 of another magnetic amplifier 52. The current through the control or input winding 52a of the amplifier 52 thus varies in magnitude as the absquare of the signal $\phi'$ appearing at the output of the amplifier 49; and the output signal or voltage from the amplifier 52 will therefore be proportional to the absquare of the time derivative of the speed of the alternator 10. This output signal as shown in Fig. 1a may be written as $\{\phi'\}$.

For the purpose of adjusting relative strengths of the signal components, as described later in detail, the output signals of the amplifiers 30, 46 and 52, i.e., the signals $\phi$, $\phi'$ $\{\phi'\}$, are passed through three respective attenuating networks N1, N2 and N3. As here shown, the attenuating network N1 includes two resistor T sections N1a and N1b, both of which are connected to receive the output voltage of the amplifier 30. The output signal from the first T section N1a always appears between an output line 54 and a common line 55 here shown as connected to ground as a point of reference potential. On the other hand, the output signal from the attenuating T section N1b is either supplied to and dissipated in a loading resistor 56, or supplied between an output line 58 and the common line 55, depending upon whether a two-position switch CR1 is in its lower or upper position.

The values of the resistors in the attenuating T section N1a are so chosen that the output signal appearing between the lines 54 and 55 is proportional to but smaller than, the input signal $\phi$. If it is assumed that the attenuation factor of the T network N1a is $k_{1a}$, then this output signal may be written $k_{1a}\phi$. In like manner, the values of the resistors of the attenuating T section N1b are chosen such that its attenuation factor may be represented as $k_{1b}$, so that the output signal or voltage appearing between the lines 55 and 58 when the contact C1 is in its upper position, may be written $k_{1b}\phi$.

The attenuating network N2 is similar to the network N1, having two separate resistive T sections N2a and N2b each connected to receive the output signal $\phi'$ from the amplifier 46. The T section N2a, therefore, produces across output lines 60, 61, a signal or voltage $k_{2a}\phi'$, where the constant $k_{2a}$ is the attenuating factor for that section. Correspondingly, the T section N2b produces across output lines 62, 61 a signal or voltage $k_{2b}\phi'$ where $k_{2b}$ is the attenuating factor of the section, when a two-position switch or contact CR2 is in its lower, illustrated position. When the switch CR2 is in its uppermost position, then no signal appears on the output line 62, and the output of the T section N2b is dissipated in a loading resistor 64.

The attenuating network N3 is similar to the networks N1 and N2. It includes two separate resistive T sections N3a and N3b, both of which are connected to receive as their inputs the $\{\phi'\}$ signal appearing at the output of the amplifier 52. The T section N3a produces between output lines 65 and 66 a signal or voltage $k_{3a}\{\phi'\}$, where the constant $k_{3a}$ is the attenuating factor of that section. In like manner, the attenuating T section N3b produces between output lines 68 and 66 a signal or voltage $k_{3b}\{\phi'\}$, where $k_{3b}$ is the attenuating factor of that section. This output signal appears on the line 68 only when a two-position switch contact CR3 is in the lower, illustrated position; when that contact CR3 is moved to its upper position, the output of the section N3b is dissipated through a loading resistor 69.

To derive a composite control signal which includes components proportional to speed deviation, the first time derivative of speed deviation, and the absquare of that time derivative, signals passed through the attenuating networks N1, N2 and N3 are supplied as inputs to a summing amplifier 70. As here shown by way of example, the summing amplifier may be a magnetic amplifier having input or control windings 71—76 connected respectively between the lines 58, 54, 60, 62, 68 and 65, and a point of reference or ground potential common with the lines 55, 61 and 66. Another input winding 77 receives a feedback signal which gives the governor system a droop characteristic, as will be explained below.

The variation in the output signal of the summing amplifier 70, which is proportional to the algebraic sum of the individual signals supplied to its windings 71—77, is utilized to adjust correspondingly the degree to which the gate valve 12 is opened or closed. For this purpose, an electro-mechanical transducer is employed, including a solenoid winding 78 connected to receive the composite output signal of the summing amplifier 70. The solenoid 78 exerts a force on a permanent magnet armature 79 which corresponds in magnitude and sense to the instantaneous magnitude and polarity of current received from the summing amplifier 70.

The armature 79 is connected with the movable plunger of a pilot valve 80 connected to control a double acting hydraulic actuator 81. As shown in Fig. 1b, the plunger of the pilot valve 80 is normally centralized so that a valve land 82 covers an outlet port 83 connected by a conduit 84 with the upper portion of the cylinder 85 of the actuator 81. A piston 86 slidable in the cylinder 84 is constructed to have a relatively large upper area $a_1$ and a smaller effective area $a_2$ on its underside. The lower portion of the cylinder 84 is connected by a conduit 88 to the output of a constant-pressure pump 89 supplying fluid under pressure from a reservoir or sump 90.

Thus, if the pressure created by the pump 89 is supplied to both the upper and lower sides of the piston 86, the greater effective area $a_1$ on the upper side will result in a net force which shifts the piston downwardly. On the other hand, if the upper end of the cylinder 85 is vented to the sump 90, then fluid pressure supplied by the pump 89 through the conduit 88 in acting on the lower area $a_2$ of the piston 86 will shift that piston upwardly.

If in response to a negative increase in the deviation signal $\phi$, the resulting current flow in the solenoid 78 shifts the armature 79 and the pilot valve land 82 upwardly, the port 83 will be uncovered to establish communication from the output of the pump 89 through a conduit 91 and the conduit 84 to the upper end of the cylinder 85. Accordingly, the piston 86 will move downwardly, compressing a spring 92 interposed between the piston 86 and the pilot valve plunger until the latter is returned to its original position with the land 82 covering and closing the port 83. On the other hand, if the current supplied to the solenoid 78 increases from zero positively causing the armature 79 and the land 82 to shift downwardly, the port 83 will be uncovered to establish communication from the upper end of the cylinder 85 through the conduit 84 and a conduit 94 to the sump 90. The piston 86 will thus move upwardly under the influence of fluid pressure supplied through the conduit 88. As the piston 86 moves upwardly, it will reduce the compression in the spring 92 permitting the armature 79 to rise until the land 82 again covers and closes the port 83.

From the foregoing, and purposely neglecting any time lags for the sake of explanation, it will be apparent that the vertical displacement $y$ of a piston rod 86a from a reference position is directly proportional to and corresponds in sense to the magnitude and polarity of the current supplied to the solenoid 79. This displacement of the piston rod 86a is caused to effect corrective adjustments in the setting of the gate valve 12 by means of a lever 95 pivoted at 95a to the piston rod 86a, at 95b to the plunger 96a of a pilot valve 96, and fulcrumed at 95c. The pilot valve in turn controls a motor operator in the form of a double-acting power actuator 97 which is connected to adjust the gate valve 12.

As the piston 86 moves upwardly or downwardly, it rocks the lever 95 about the pivot connection 95c as a fulcrum and thus raises or lowers the valve plunger 96a, causing lands on the latter to uncover ports 96b and 96c. Pressure fluid thus flows through the valve 96 from the pump 89 to one side or the other of the piston 97a, and is vented from the opposite side of the piston 97a through the valve 96 to the sump 90. Accordingly, the power piston 97 is shifted downwardly or upwardly at a rate proportional to the displacement y and the degree to which the ports 96b and 96c are opened.

The power piston 97a is connected with one end of a lever 98 which carries at its opposite end an arcuate rack 99 meshing with a pinion 12a on the gate valve 12. As the piston 97a moves upwardly or downwardly, the pinon 12a is rotated to increase or decrease the opening of the gate valve. This, in turn, changes the rate at which pressurized water is fed through the chute 14 to the turbine 11, decreasing or increasing the rate at which energy for driving the turbine is supplied to the latter.

The displacement of the piston 97a, and the setting of the gate valve 12, from a reference position may be designated by the symbol Z as shown in Fig. 1b. As the displacement Z increases positively, the gate valve 12 is opened wider. Since the rate of displacement of the piston 97a is substantially proportional but opposite in sense to the displacement y, an equation may be written:

$$-k_3 Z' = y \qquad (1)$$

where $k_3$ is a factor of proportionality.

In order to bring the displacement y to zero, and make the displacement Z steady at a desired value so that the gate valve 12 is held at a desired setting under steady state conditions, means are provided to create a droop signal proportional to the displacement Z and to combine that signal with the deviation signal $\phi$. As here diagrammatically shown, the piston 97a is connected to shift the pivoted slider 100a of a potentiometer 100 which is energized from a constant voltage source or battery 102 through an adjustable resistor 103. As the piston 97a moves, and the displacement Z increases, the voltage appearing between the slider 100a and a point of reference potential (ground) correspondingly increases, and is thus proportional to Z. That voltage signal, which may be written $k_4 Z$ where $k_4$ is a factor of proportionality selected by setting the resistor 103, is fed back over the line 104 to the input winding 77 with a polarity such that it opposes or subtracts from the deviation signal $\phi$ applied to the windings 71 and 72.

When the system is to act as a speed governor, i.e., when the disconnect switch 15 is opened and the alternator 10 is not subjected to synchronizing torque, it is necessary to adjust the setting of the gate valve 12 rapidly in response to a large deviation in the speed of the alternator from the desired value. Yet, as the speed deviation becomes small, the rate of movement of the gate valve should be decreased to avoid overshoot or hunting.

Let the displacements of the lever 98 from an original position of equilibrium be designated by the symbol Z, as indicated above. Neglecting time lags in the system for simplicity, the rate Z' at which the lever 98 is displaced to correctively adjust the gate valve 12 depends upon the degree to which the ports 96b and 96c are opened, and that in turn is controlled by the displacement y of the piston rod 86a. As previously stated, the displacement y is proportional to the magnitude of current supplied to the solenoid 78, such current being proportional to the sum of the signals supplied to the input windings 71—77 for the amplifier 70.

With the switch contacts CR1, CR2, and CR3 in the positions shown by Fig. 1a, the amplifier input windings 72—76 receive current signals $k_{1a}\phi$, $k_{2b}\phi'$, $k_{2a}\phi'$, $k_{3b}\{\phi'\}$, and $k_{3a}\{\phi'\}$, respectively. The input winding 71 receives no signal. The input winding 77 receives an opposing droop signal, $k_4 Z$. With this in mind, the transient relation between the displacement y and the alternator's speed deviation may be written:

$$y = (k_{1a})\phi + (k_{2a}+k_{2b})\phi' + (k_{3a}+k_{3b})\{\phi'\} + k_4 Z \qquad (2)$$

Recalling that y is related to the rate of change of Z, as expressed in Equation 1, supra, the transient response of the system may thus be written:

$$-k_3 Z' - k_4 Z = (k_{1a})\phi + (k_{2a}+k_{2b})\phi' + (k_{3a}+k_{3b})\{\phi'\} \qquad (3)$$

This expression shows that as long as the alternator 10 does not have precisely the desired speed, the lever 98 will be moved to correctively increase or decrease the opening of the gate valve 12, thus to increase or decrease the rate at which water flows to the turbine 11. This correctively changes the speed at which the alternator is driven until it is turning at the desired speed. The alternator speed which is thus automatically maintained is determined in the first instance by the setting of the rheostat 29c.

When the transient response following any disturbance is ended the alternator's speed will be constant, so that the derivative signal $\phi'$ and the absquare of that derivative $\{\phi'\}$ will both be zero. The power piston 97a and the gate valve 12 will be stationary in their settings, so Z' will be zero. Thus, under steady state conditions, the displacement y is zero, and the Equation 2 may be rewritten:

$$-k_2 Z = k_{1a}\phi \qquad (4)$$

This expression shows that by changing the setting of the rheostat 29c, and thus changing the value of the speed voltage $e_s$ in relation to the alternator's speed, the deviation signal $\phi$ may be changed so that the power piston 97a and the gate valve 12 are shifted to a new steady state position. The rheostat 29c in effect controls the steady state setting of the gate valve, and the alternator speed which is automatically maintained by the governor.

Figure 2A:
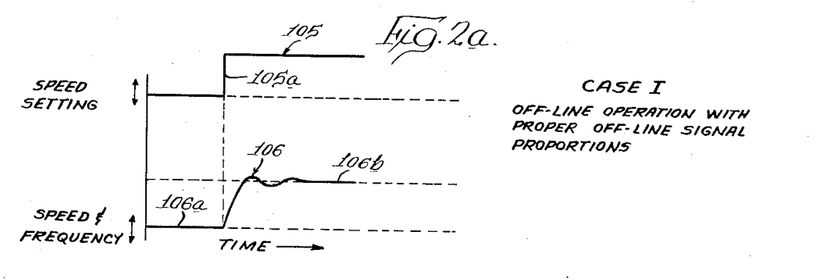
Figs. 2a through 2d are graphic illustrations of transient responses produced by the governing system of Figure 1 under four respective conditions.

As explained in my aforementioned copending application, Serial No. 384,957, a transient control function such as that expressed above by Equation 3, including a proportional term, a first derivative term and a non-linear or absquare term results in very fast, reliable governing action without appreciable overshoot or cycling about the control point. Referring to Fig. 2a, if a sudden disturbance is created in the system, as, for example, suddenly increasing the speed setting by reducing the effective value of the rheostat 29c, as shown by the curve 105 at 105a, then the speed of the alternator 10 will be quickly increased from an original value 106a to a new value 106b as shown by the transient curve 106. The curve 106 also represents the variation in frequency of the voltage generated by the alternator 10, since that frequency is proportional to the speed of the alternator. With the disconnect switch 15 open, therefore, there is provided a very fast acting speed governing system for the alternator which enables the alternator to be brought quickly from a standstill up to synchronous speed, and which enables that synchronous speed to be maintained automatically despite abrupt disturbances which may be encountered. Because it is essential that the alternator 10 be quickly and precisely synchronized with the frequency of the voltage appearing on the distribution line 16, before the disconnect switch is closed, the governing system described above meets a pressing need.

In accordance with the present invention, provision is made to change the factors of proportionality relating the deviation, first time derivative of deviation, and absquare of derivative of deviation signal components to the actual deviation in speed of the alternator from the control point, as an incident to closure of the switch 15 and connection of the alternator 10 to the distribution line 16. For once the alternator 10 has been synchronized and connected to the distribution line 16, its speed will be maintained substantially at a synchronous value by virtue of synchronizing torque. Under those conditions, the characteristics of the controlled water turbine 11 and alternator 10 are radically changed, and the governor now controls not the speed of the alternator, but rather the loading thereof, i.e., the electrical power which it pours into or takes from the distribution line 16.

First, pursuant to the present invention, provision is made to increase the relative strength of the deviation signal component, while considerably decreasing the relative strengths of the time derivative and absquare signal components. For this purpose, in the exemplary drawings, a control relay CR is connected in series with an appropriate source or battery 110 and a switch contact 111 controlled by the disconnect switch 15. The control relay is mechanically connected to actuate the three switch contacts CR1, CR2 and CR3, causing those contacts to be moved to their uppermost positions whenever the disconnect switch 15 is closed.

It will be seen that with the coil CR energized the contacts CR1 will now supply a signal from the attenuating T section N1b over the line 58 to the input winding 71. The contacts CR2 will disconnect the line 62 and the amplifier input winding 73 from the attenuating T section N2b, and connect the loading resistance 64 across that section. The contacts CR3 will disconnect the output line 68 and the amplifier input winding 75 from the attenuating T section N3b, replacing the winding 75 by the equivalent loading resistance 69 across the output of that attenuating section.

Under such circumstances, the input signals to the summing amplifier 70 and the corresponding rate of displacement $Z'$ of the lever 98 may be expressed:

$$-k_3 Z + k_4 Z = (k_{1a} + k_{1b})\phi + (k_{2a})\phi' + (k_{3a})\phi' \quad (5)$$

It will be seen by comparing Equations 3 and 5 that closure of the switch 15 to place the alternator 10 on the distribution line results in increasing the relative strength of the deviation signal component $\phi$, the increase amounting to the addition of the term $k_{1b}\phi$ to the original term $k_{1a}\phi$. Preferably, the constant $k_{1b}$ has a value on the order of 9 times that of the constant $k_{1a}$, so that the deviation term $\phi$ in Equation 5 is on the order of 10 times greater than the corresponding deviation term $\phi$ in Equation 3.

It will also be seen from Equations 3 and 5 that when the disconnect switch 15 is closed and the alternator 10 connected to the line 16, the first derivative control signal component is decreased in its relative strength. Originally, it involved values of $k_{2a}\phi' + k_{2b}\phi'$, but as shown in Equation 5 it involves only the single term $k_{2a}\phi'$. Preferably, the constant $k_{2b}$ provided by the values of the resistors selected for the attenuating T section N2b is on the order of 49 times as great as the constant $k_{2a}$, which is determined by the values of the resistors employed in the T section N2a. Thus, the relative strength of the first derivative term $\phi'$ is reduced in Equation 5 to about $\frac{1}{50}$ of its value in Equation 3.

Comparison of Equation 3 and 5 will also show that the absquare signal component is reduced in relative strength when the disconnect switch 15 is closed to connect the alternator 10 with the line 16. Whereas in governing the speed of the isolated alternator 10, the system employed absquare terms $k_{3a}\{\phi'\}$ and $k_{3b}\{\phi'\}$ (Equation 3), with the alternator connected to the line only the term $k_{3a}\{\phi'\}$ is effective. Preferably, the value of the constant $k_{3b}$, as determined by the resistors employed in the attenuating T section N3b, is made on the order of 49 times greater than the value of the constant $k_{3a}$, which is determined by the value of the resistors employed in T section N3a. Thus, in switching the alternator 10 onto the line, and changing the control function from that represented by Equation 3 to that represented by Equation 5, the relative strength of the non-linear or absquare term is reduced by a ratio of approximately 50 to 1.

Figure 2B:
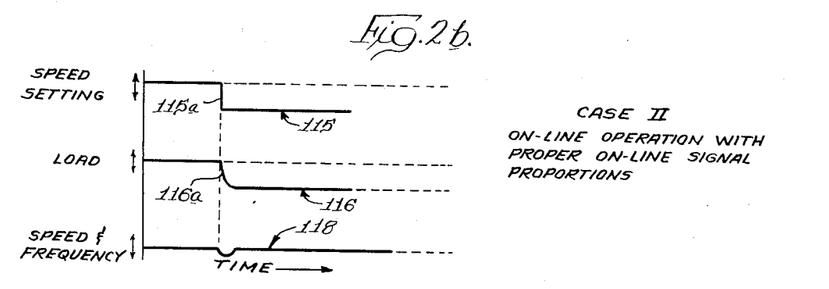

When the alternator 10 has been connected with the distribution line 16 by closure of the switch 15, it is held substantially at synchronous speed by synchronizing torque. However, the electrical power generated by the alternator and supplied to the line 16 is determined by adjustment of the rheostat 29c which changes the speed voltage $e_s$ and thus changes the magnitude of the deviation signal $\phi$ appearing at the output of the amplifier 30. When the alternator is supplying substantially rated power into the distribution line 16 and it is desired to reduce the loading thereof, the "speed setting" of the rheostat 29c may be reduced. If that speed setting is reduced abruptly as represented by the graph 115 at 115a (Fig. 2b), then the deviation signal $\phi$ will be increased in magnitude, and owing to the fact that it is transferred over both of the output lines 58 and 54 to both of the summing amplifier input windings 71 and 72 (Fig. 1), it will result in a relatively large current being supplied to the solenoid 78. As a result, the hydraulic actuator 97 will quickly reduce the opening of the gate valve 12. Less power is supplied to the turbine 11, and less electrical power is transferred from the alternator 10 to the line 16. The loading of the alternator 10, as represented by the graph 116 in Fig. 2b, drops very quickly as shown at 116a to a lower value, and without violent swings. The speed and frequency of the alternator 10 as represented by the graph 118 in Fig. 2b are hardly affected.

Figure 2C:
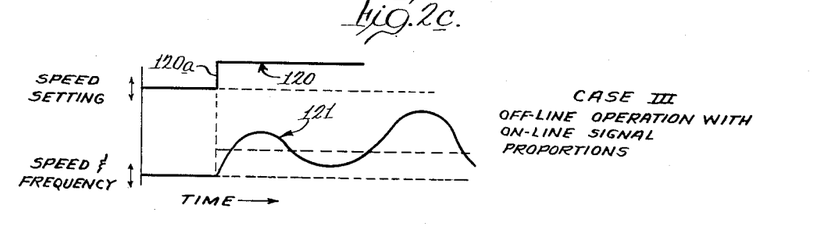

It is indeed desirable that the loading of the alternator be susceptible of quick changes and without oscillations or hunting in the loading. The relative strengths of the signal components provided by the attenuating networks N1, N2 and N3 when the relay CR is actuated, are of proper values to produce the very fast response illustrated in Fig. 2b. To illustrate the importance of this change in relative signal strengths, the undesirable effects which would occur if the system were operated with the disconnect switch 15 open, but with the attenuating networks N1, N2 and N3 providing proportionality factors related in the manner expressed by Equation 5, are illustrated in Fig. 2c. If the speed setting represented by the graph 120 were abruptly increased, as at 120a, then the speed and frequency of the alternator would increase but swing violently above and below their new values as represented by the graph 121. It would be very difficult to change the speed of the alternator from zero and up to a synchronous speed at which closure of the disconnect switch could be successfully effected; and at the very least, a considerable amount of time and manipulation would be required. This is totally inacceptable to the requirements of modern day power generating stations where in emergencies it is often necessary that an alternator be brought from a standstill precisely to synchronous speed with a minimum of delay.

Figure 2D:
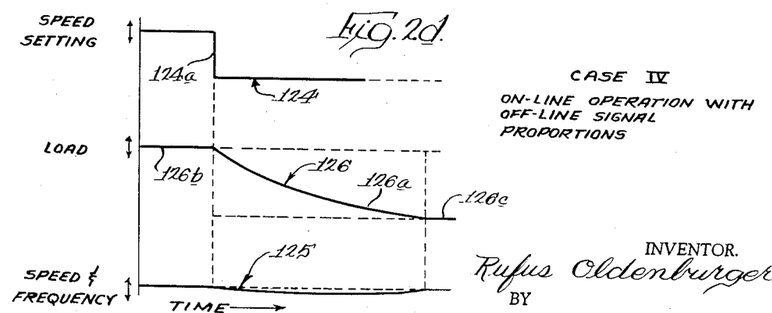

Fig. 2d illustrates the undesirable effects which would result if the system were operated with the relative signal strengths of Equation 3 when the alternator is connected on the line, i.e., if the contacts CR1, CR2 and CR3 were in the lower, illustrated positions when the disconnect switch 16 were closed. Under those circumstances, the deviation signal $\phi$ would be relatively small in magnitude as indicated by Equation 3, supra, while the strength of the time derivative in absquare signal components would be relatively great. If when the alternator 10 were operating with a given amount of loading, the speed setting were abruptly reduced to reduce the loading of the alternator, the loading would not be quickly reduced but would gradually diminish over a long period of time. As shown in Fig. 2d, the speed setting is represented by the graph 124, and the abrupt drop at 124a corresponds to a quick adjustment made by an operator in order to reduce the loading of the alternator. Such an abrupt change of the speed setting would not produce an appreciable change in the speed of the alternator as shown by the graph 125 in Fig. 2d. However, the loading of the alternator, represented by the graph 126, would not decrease rapidly as is desired, but instead would decay very slowly, as represented by the graph portion 126a, from an initial value 126b to the desired value 126c. The time delay required to effect the change in loading would be entirely unacceptable, so that the "on line" operation of the system with the "off line" signal proportions could not be employed.

Through the provision of the attenuating networks N1, N2 and N3, together with means for effectively switching them in response to connection or disconnection of the alternator 10 to or from the line 16, a governing system is achieved which provides very fast and reliable speed control of the alternator when it is "off the line," permitting changes in speed to be made quickly without overshoot or hunting. On the other hand, when the alternator is connected "on the line," a different control characteristic is automatically obtained, permitting changes in loading of the alternator to be accomplished quickly and without cycling.

Figure 3:
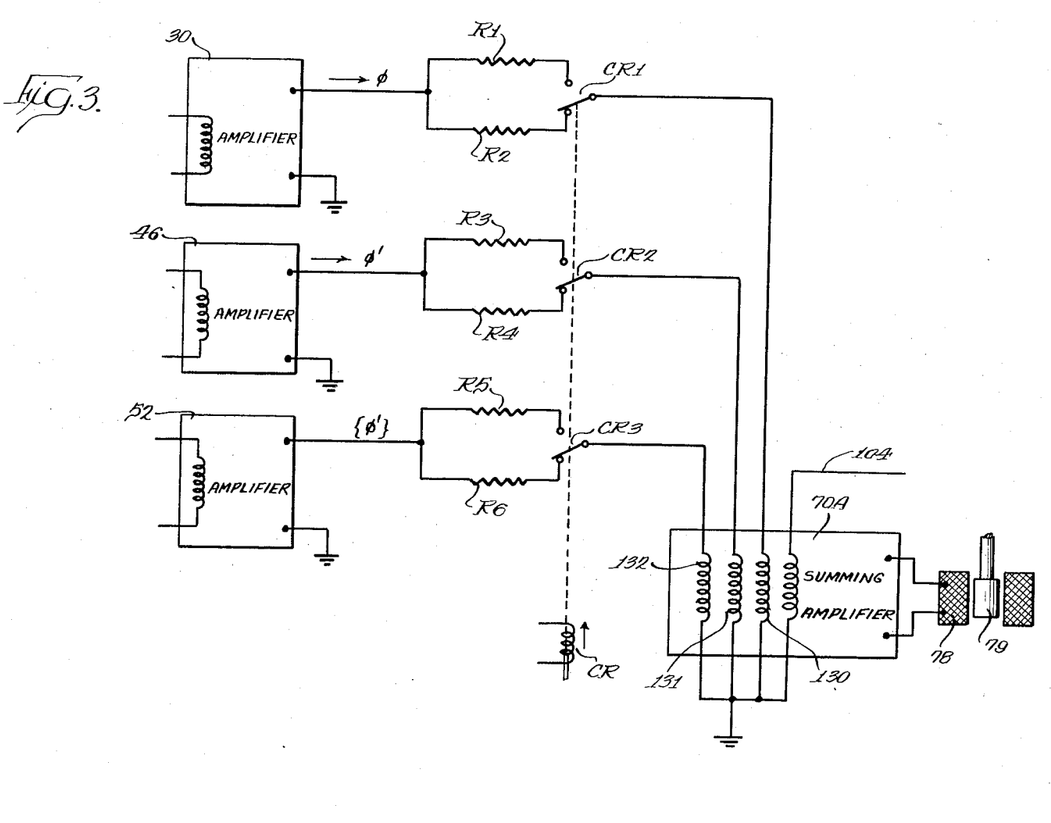
Fig. 3 is a schematic diagram, corresponding to a portion of Figure 1, showing a simplified, modified, embodiment of the invention.

Fig. 3 illustrates a simplified and modified form of the invention. Only a portion of the apparatus corresponding to that interposed between the amplifiers 30, 46 and 52, and the summing amplifier 70 in Figs. 1a and 1b is shown in Fig. 3. The attenuating network which receives the deviation signal $\phi$ comprises simply two resistors R1 and R2, the first having a relatively low resistance value and the second having a relatively high resistance value. The attenuating network for the time derivative signal component $\phi'$ may comprise simply two resistors R3 and R4 having relatively high and relatively low values, respectively. In a similar manner, the attenuating network for receiving and passing the absquare signal $\{\phi'\}$ may comprise simply two resistors R5 and R6, having relatively high and low resistance values, respectively.

The summing amplifier 70A in this instance, is provided with three input windings 130, 131, 132, which are alternatively connected to the resistors R1, R2, R3 or R4, and R5 or R6 by the switch contacts CR1, CR2, and CR3, controlled by the relay CR. Thus, with the relay CR de-energized and the alternator 10 disconnected from the line 16 (Fig. 1a) so that the switch contacts have the positions illustrated in Fig. 3, the high valued resistor R2 will transmit a deviation signal $\phi$ of relatively low strength to the input winding 130. The relatively low valued resistor R4 will transmit a relatively high valued time derivative signal $\phi'$ to the amplifier input winding 131; and the relatively low valued resistor R6 will transmit a relatively strong absquare signal $\{\phi'\}$ to the input winding 132. This will produce a control which rapidly corrects major disturbances, permits quick changes in the speed of the alternator 10 when it is disconnected from the distribution line.

On the other hand, when the alternator is connected to the distribution line and the control relay CR energized, the contact CR1 in Fig. 3 will connect with the relatively low value resistor R1 so that a relatively strong deviation signal $\phi$ will be supplied to the amplifier input winding 130. Correspondingly, the contact CR2 will connect with the relatively high value resistor R3 so that a relatively weaker time derivative signal $\phi'$ will be supplied to the input winding 131; while the contact CR3 will connect with the relatively high value resistor R5 so that a relatively weaker absquare signal $\{\phi'\}$ will be supplied to input winding 132. Under these conditions therefore, changes in the loading of the alternator 10 by adjustment of the gate valve 12 in response to re-setting of the rheostat 29c (Fig. 1a) may be made quickly for the reasons previously given.

While the arrangement illustrated in Fig. 3 will perform quite satisfactorily in automatically changing the attenuation of the three signal components, and modifying their factors of proportionality automatically when the alternator is switched onto or off of the line 16, the arrangement illustrated by Figs. 1a and 1b is preferred. The first arrangement is preferred because if there should be a failure of one of the switch contacts to establish good electrical connection in either of its positions, there would still be supplied to the summing amplifier a deviation, a time derivative, and an absquare signal component. Thus, the arrangement shown by Fig. 1 makes it absolutely certain that the governing system cannot lose all control of the alternator in the event that the relay CR and its contacts CR1, CR2 and CR3 fail to operate properly.

From the foregoing, it will be apparent that the present invention contemplates a single non-linear governing system which is effective to provide optimum performance automatically when the alternator is either disconnected from a distribution line or connected to it. Speed control of the alternator and synchronizing of its generated voltage to the frequency and phase of that appearing on the distribution line, may be accomplished conveniently and with a minimum of time delay; while after the alternator is connected to the distribution line its loading may be changed and adjusted to any desired value conveniently and quickly.

I claim as my invention:

1. In a system for governing the speed and loading of an alternator driven by a prime mover, such system including a motor operator connected to adjust a device controlling the power input to the prime mover, and means for selectively switching the alternator on or off a distribution line; the combination comprising means for creating a first signal which varies in proportion to the deviation of the alternator's speed from a desired control point, means for creating a second signal which varies in proportion to the absquare of a time derivative of said deviation, means for increasing or decreasing the factor of proportionality for said first signal in response to operation of said switching means placing the alternator on or off the line, respectively, means for decreasing or increasing the factor of proportionality for said second signal in response to operation in said switching means placing the alternator on or off the line, respectively, and means for energizing said motor operator in accordance with the algebraic sum of said first and second signals.

2. In a system for governing the speed and loading of an alternator driven by a prime mover, such system including means for selectively switching the alternator on or off the distribution line, and a motor operator connected to adjust a device controlling the power input to the prime mover; the combination comprising means for creating a first signal which varies in proportion to the deviation of the alternator's speed from a desired value, means for creating a second signal which varies in proportion to a time derivative of said deviation, means for creating a third signal which varies in proportion to the absquare of said derivative, means for relatively increasing the strength of said first signal and for relatively decreasing the strength of said second and third signals as an incident to operation of said switching means connecting the alternator "on the line," means for algebraically combining said first, second and third signals to obtain a control signal, and means for controlling the motor operator in accordance with said control signal.

3. In a system for governing the speed and loading of an alternator driven from an hydraulic turbine, such system including a valve controlling the admission of pressurized liquid to the turbine, a motor operator for adjusting the valve, and a switch for connecting or disconnecting the alternator to or from a distribution line; the combination comprising means for creating a first signal proportional to deviations from a reference value in the speed of the alternator, means for creating a second signal proportional to the first time derivative of said deviations, means receiving said second signal for creating a third signal proportional to the absquare thereof, means for algebraically combining said first, second and third signals to derive a control signal, means for causing said motor operator to adjust said valve in a direction and at a rate corresponding to the sign and magnitude of said control signal, means for increasing or decreasing the proportionality factor for said first signal by a ratio on the order of 10:1 in response to operation of said switch respectively connecting or disconnecting the alternator to or from the line, and means for decreasing or increasing the proportionality factors for said second and third signals by a ratio on the order of 50:1 in response to operation of said switch respectively connecting or disconnecting the alternator to or from the line.

4. In a system for governing the speed and loading of an alternator driven from a prime mover having its power input controlled by a device connected to be adjusted by a motor operator, the combination comprising means responsive to the speed of the alternator for creating first, second, and third signals which are proportional to the deviation of the alternator speed from a control point, the first derivative of such deviation, and the absquare of such first derivative, respectively, means for adjusting the device in accordance with the algebraic sum of said three signals, and means for increasing the relative strength of said first signal when the alternator is connected "on the line" as compared to when the alternator is "off the line."

5. In a system for governing the speed and loading of an alternator driven from a prime mover having its power input controlled by a device connected to be adjusted by a motor operator, the combination comprising means responsive to the speed of the alternator for creating first, second, and third signals which are proportional to the deviation of the alternator speed from a control point, the first derivative of such deviation, and the absquare of such first derivative, respectively, means for adjusting the device in accordance with the algebraic sum of said three signals, and means for decreasing the relative strength of said second signal when the alternator is connected "on the line" as compared to when the alternator is "off the line."

6. In a system for governing the speed and loading of an alternator driven from a prime mover having its power input controlled by a device connected to be adjusted by a motor operator, the combination comprising means responsive to the speed of the alternator for creating first, second and third signals which are proportional to the deviation of the alternator speed from a control point, the first derivative of such deviation, and the absquare of such first derivative, respectively, means for adjusting the device in accordance with the algebraic sum of said three signals, and means for decreasing the relative strength of said third signal when the alternator is "on the line" as compared to when the alternator is "off the line."

7. In a system for governing an alternator driven by a prime mover having its power input controlled by an adjustable device and wherein the alternator is selectively connectable to a distribution line by a disconnect switch, the combination comprising means for generating a voltage proportional to the speed of the alternator, means for creating a reference voltage and means for algebraically combining the same with said speed voltage to create a first voltage signal, means for creating a second voltage signal proportional to the first time derivative of said speed voltage, means for creating a third voltage signal proportional to the absquare of said second voltage, first, second and third attenuators connected to receive as their respective inputs said first, second and third voltage signals, said first attenuator having a switch contact actuatable to decrease its attenuation factor, said second and third attenuators having switch contacts actuatable to increase their attenuation factors, means for adjusting said device in accordance with the algebraic sum of the output signal voltages from said attenuators, and a relay having a coil connected to be energized when said disconnect switch is closed and associated with said contacts to actuate the same.

References Cited in the file of this patent

UNITED STATES PATENTS

| | | |
|---|---|---|
| 1,829,427 | Wensley | Oct. 27, 1931 |
| 1,873,976 | Montgomery | Aug. 30, 1932 |
| 2,428,702 | Elliot | Oct. 7, 1947 |
| 2,494,876 | Hornfeck | Jan. 17, 1950 |
| 2,506,266 | Cage | May 2, 1950 |
| 2,590,023 | Lewis et al. | Mar. 18, 1952 |
| 2,593,950 | Williams | Apr. 22, 1952 |
| 2,663,832 | McDonald et al. | Dec. 22, 1953 |
| 2,674,708 | Husted | Apr. 6, 1954 |
| 2,697,174 | Stivender | Dec. 14, 1955 |
| 2,710,933 | Dion | June 14, 1955 |